(12) United States Patent
Chen et al.

(10) Patent No.: US 7,312,653 B2
(45) Date of Patent: Dec. 25, 2007

(54) NMOS REVERSE BATTERY PROTECTION

(75) Inventors: Keming Chen, Torrance, CA (US);
David Tang, Fontana, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 100 days.

(21) Appl. No.: 11/077,475

(22) Filed: Mar. 10, 2005

(65) Prior Publication Data
US 2006/0202746 A1    Sep. 14, 2006

(51) Int. Cl.
*G01F 1/10*   (2006.01)
(52) U.S. Cl. .................... 327/545; 361/245; 361/246
(58) Field of Classification Search ............... 361/84, 361/245, 82, 246; 307/130, 131; 327/545, 327/546
See application file for complete search history.

(56) References Cited

U.S. PATENT DOCUMENTS

| | | | | |
|---|---|---|---|---|
| 4,546,302 A | * | 10/1985 | Smith | .......... 320/163 |
| 4,868,706 A | * | 9/1989 | Zaderej | .......... 361/101 |
| 5,517,379 A | * | 5/1996 | Williams et al. | .......... 361/84 |
| 5,539,610 A | * | 7/1996 | Williams et al. | .......... 361/246 |
| 5,757,600 A | * | 5/1998 | Kiraly | .......... 361/84 |
| 6,154,081 A | * | 11/2000 | Pakkala et al. | .......... 327/309 |
| 6,239,515 B1 | * | 5/2001 | Mackel et al. | .......... 307/127 |

\* cited by examiner

*Primary Examiner*—Dinh T. Le

(57) ABSTRACT

A reverse polarity protected system comprises a voltage source that includes positive and negative terminals. A polarity-sensitive device has a first terminal that communicates with the positive terminal of the voltage source, and that includes a second terminal. A low-resistance switch communicates with the first and second terminals of the voltage source, and communicates with the second terminal of the polarity-sensitive device. The low-resistance switch assumes a conducting state between the second terminal of the polarity-sensitive device and the negative terminal of the voltage source when a first voltage at the positive terminal of the voltage source minus a second voltage at the negative terminal of the voltage source is greater than a threshold voltage. Otherwise, the low-resistance switch assumes a non-conducting state.

15 Claims, 4 Drawing Sheets

NMOS REVERSE BATTERY PROTECTION

FIELD OF THE INVENTION

The present invention relates to reverse voltage protection.

BACKGROUND OF THE INVENTION

When a circuit is powered by a voltage source, there will often be adverse effects if the voltage source is connected with reverse polarity. For example, a vehicle has positive and negative battery cables that connect to positive and negative terminals of a battery. If the positive cable is attached to the negative terminal of the battery and the negative cable is attached to the positive terminal of the battery, the voltage source is connected with reverse polarity.

Referring now to FIG. 1A, an electrical schematic of a circuit 100 incorporating a fuse-based reverse polarity protection system according to the prior art is presented. This circuit includes a transistor 102. In this implementation the transistor 102 is an n-channel metal-oxide semiconductor field-effect transistor (MOSFET) that has a gate, source, drain, and body, although other transistor types may be used. A first terminal of a voltage source 104 communicates with a first terminal of a fuse 106. A second terminal of the fuse 106 communicates with a negative terminal of a first diode 108 and with a first terminal of an inductor 110. A positive terminal of the first diode 108 communicates with a second terminal of the voltage source 104. A second terminal of the inductor 110 communicates with the drain of the transistor 102 and with a positive terminal of a second diode 112. The source and the body of the transistor 102 communicate with the second terminal of the voltage source 104. A negative terminal of the second diode 112 communicates with a first terminal of a capacitor 114. A second terminal of the capacitor 114 communicates with the second terminal of the voltage source 104.

In normal operation, voltage at the first terminal of the voltage source 104 is positive in reference to the second terminal of the voltage source 104. The fuse 106 operates as a small resistance, and the first diode 108 is reverse biased. Current flows through the inductor 110 and then into the transistor 102 and/or the second diode 112. One of the disadvantages of this approach is that current must always flow through the fuse 106, regardless of whether it later flows through the transistor 102 or through the second diode 112. The fuse must be rated for this continuous current, and dissipates power continuously.

Referring now to FIG. 1B, an electrical schematic 120 depicts the circuit of FIG. 1A when the voltage source is connected with reverse polarity. To make operation more apparent, the circuit has been redrawn upside down. The body of the transistor 102 is now at the highest potential in the circuit. The pn junction between the body of the transistor 102 and the source of the transistor 102 is now forward-biased. Without the protection afforded by the fuse 106, the pn junction of the transistor 102 would conduct as much current as the voltage source 104 could provide. This large current may damage the transistor 102.

Instead, the first diode 108 is now forward biased and conducts as much current as the voltage source 104 will allow. The large amount of current quickly blows the fuse 106, effectively disconnecting the voltage source 104 from the remainder of the circuit. The fuse 106 must be replaced once the polarity of the voltage source 104 is corrected, a disadvantage of this approach in terms of replacement costs and labor.

Referring now to FIG. 2A, an electrical schematic of a circuit 140 incorporating a PMOS-based reverse polarity protection system according to the prior art is presented. This circuit includes first and second transistors, 142 and 144, respectively. In this implementation the first transistor 142 is a p-channel MOSFET and the second transistor 144 is an n-channel MOSFET, each having a gate, source, drain, and body, although other transistor types may be used. A first terminal of a voltage source 146 communicates with the drain of the first transistor 142. The gate of the first transistor 142 communicates with a second terminal of the voltage source 146. The source and the body of the first transistor 142 communicate with a first terminal of an inductor 148. A second terminal of the inductor 148 communicates with a positive terminal of a diode 150 and with the drain of the second transistor 144. A negative terminal of the diode 150 communicates with a first terminal of a capacitor 152. A second terminal of the capacitor 152 and the source and the body of the second transistor 144 communicate with the second terminal of the voltage source 146.

In normal operation, the gate-to-source voltage ($V_{GS}$) of the first transistor 142 is less than zero, and the first transistor 142 conducts current. Because the voltage drop of the first transistor 142 is interposed between the first terminal of the voltage source 146 and the first terminal of the inductor 148, the possible voltage that can be applied across the capacitor 152 is decreased. In addition, all current flows through the first transistor 142, regardless of whether it then flows through the second transistor 144 or the diode 150. This requires the use of a more expensive transistor.

Referring now to FIG. 2B, an electrical schematic 160 depicts the circuit of FIG. 2A when the voltage source 146 is connected with reverse polarity. To make operation more apparent, the circuit has been redrawn upside down. The gate of the first transistor 142 is now connected to the supply voltage. The voltage at the source of the first transistor 142 can be no greater than the supply voltage, so $V_{GS} \geq 0$. The first transistor 142 is thus turned off, and no current will flow in the circuit.

SUMMARY OF THE INVENTION

A reverse polarity protected system is presented for a voltage source that includes positive and negative terminals. The system comprises a polarity-sensitive device that has a first terminal that communicates with the positive terminal of the voltage source, and that includes a second terminal. The system further comprises a low-resistance switch that communicates with the positive terminal of the voltage source, the negative terminal of the voltage source, and the second terminal of the polarity-sensitive device. The low-resistance switch assumes a conducting state between the negative terminal of the voltage source and the second terminal of the polarity-sensitive device when a first voltage at the positive terminal of the voltage source minus a second voltage at the negative terminal of the voltage source is greater than a first threshold voltage. Otherwise, the low-resistance switch assumes a non-conducting state between the negative terminal of the voltage source and the second terminal of the polarity-sensitive device when the first voltage minus the second voltage is less than a second threshold voltage.

In other features, the low-resistance switch includes an n-channel field effect transistor (FET) that has a gate terminal, a drain terminal, a source terminal, and a body terminal. In still other features, the first and second threshold voltages are equal to a physical threshold voltage of the transistor.

In still other features, the gate terminal of the transistor communicates with the positive terminal of the voltage source, the drain terminal of the transistor communicates with the second terminal of the polarity-sensitive device, and the source and body terminals of the transistor communicate with the negative terminal of the voltage source.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1B:
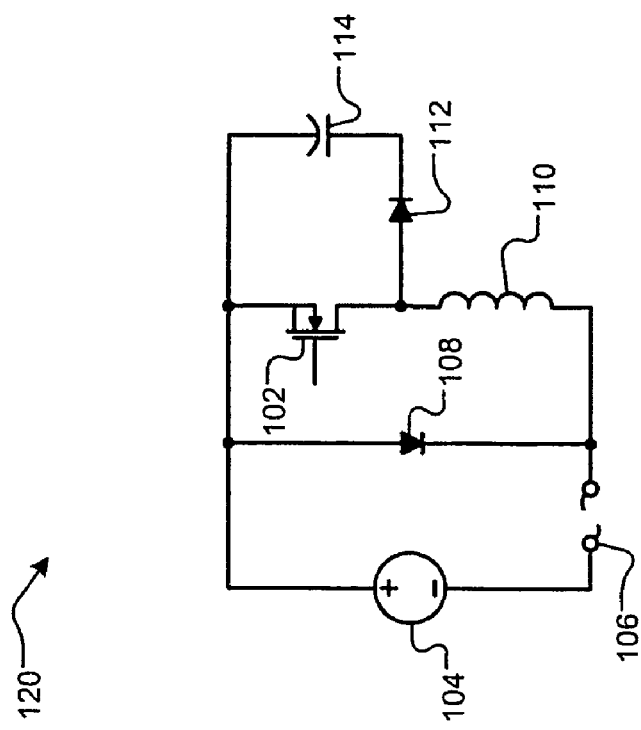
FIG. 1B is an electrical schematic of the circuit of FIG. 1A depicting the voltage source connected with reverse polarity.
Figure 1A:
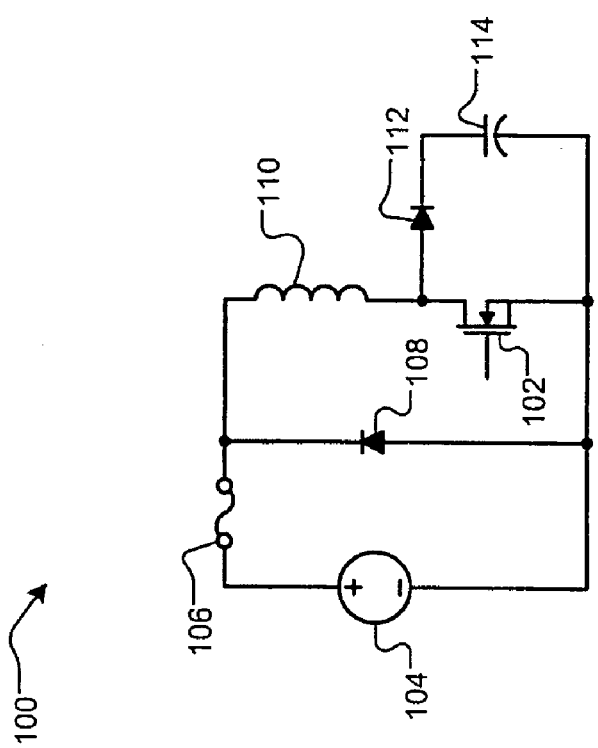
FIG. 1A is an electrical schematic of a circuit incorporating a fuse-based reverse polarity protection system according to the prior art.
Figure 2B:
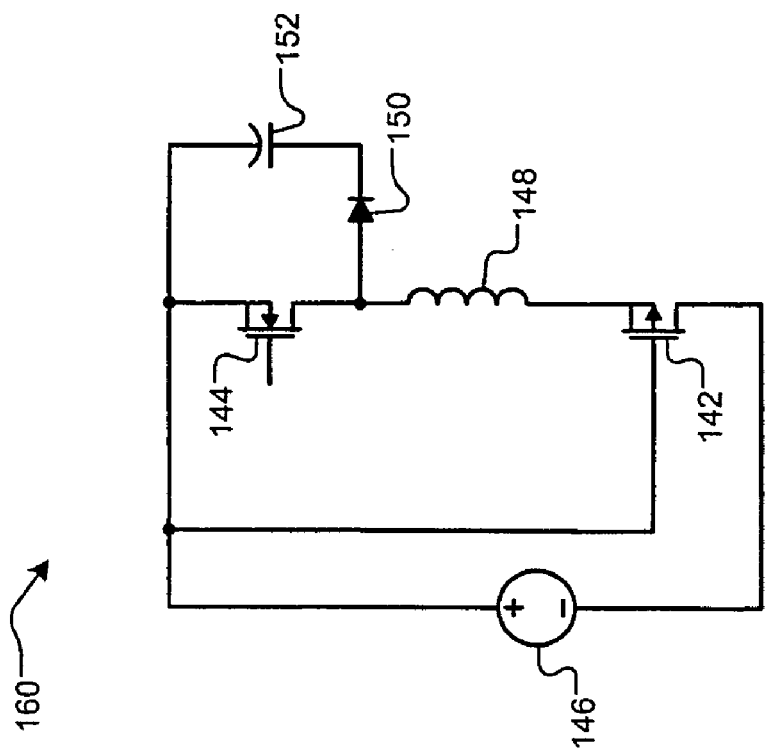
FIG. 2B is an electrical schematic of the circuit of FIG. 2A depicting the voltage source connected with reverse polarity.
Figure 2A:
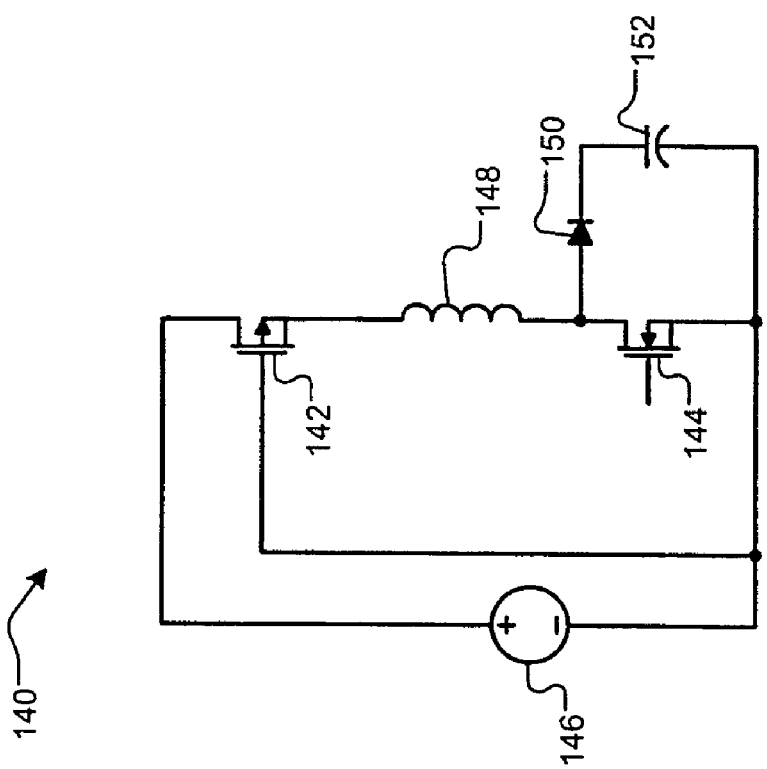
FIG. 2A is an electrical schematic of a circuit incorporating a PMOS-based reverse polarity protection system according to the prior art.

The following description of the preferred embodiments is merely exemplary in nature and is in no way intended to limit the invention, its application, or uses. For purposes of clarity, the same reference numbers will be used in the drawings to identify similar elements.

Figure 3B:
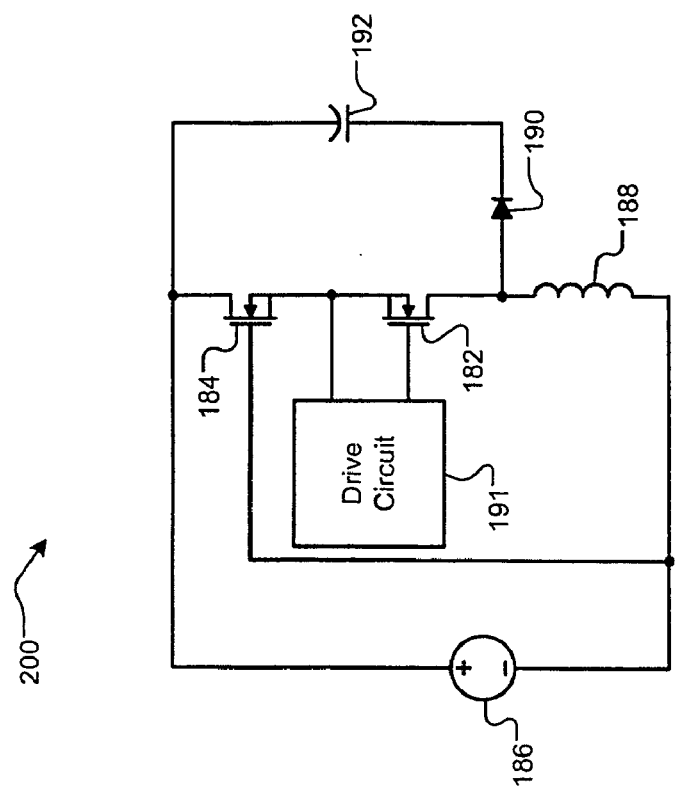
FIG. 3B is an electrical schematic of the exemplary circuit of FIG. 3A depicting the voltage source connected with reverse polarity.
Figure 3A:
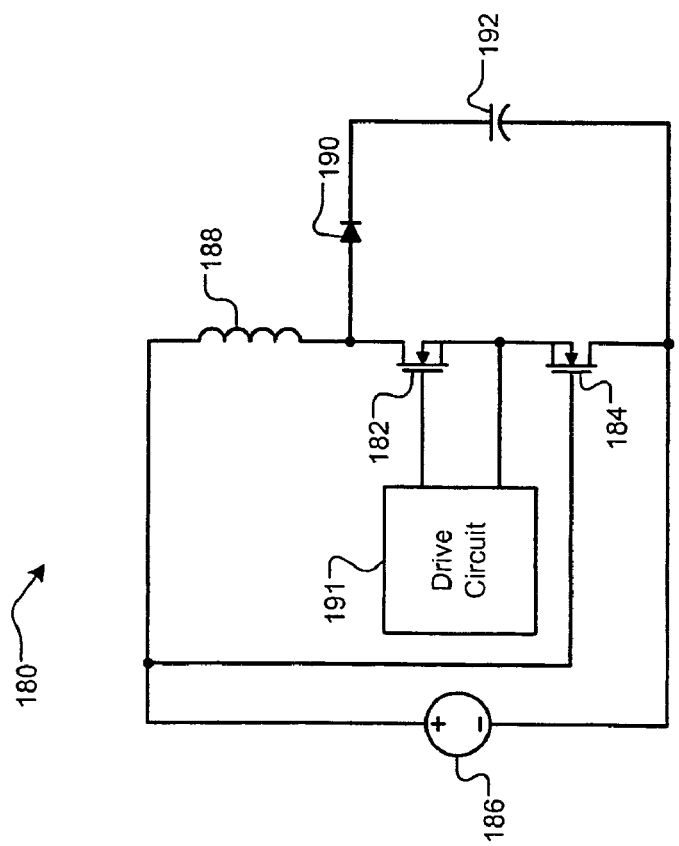
FIG. 3A is an electrical schematic of an exemplary circuit incorporating a reverse polarity protection system according to the principles of the present invention.

Referring now to FIG. 3A, an electrical schematic of an exemplary circuit 180 incorporating an NMOS-based reverse polarity protection system is presented. This circuit includes first and second transistors, 182 and 184, respectively. In this implementation the first and second transistors, 182 and 184, are n-channel MOSFETs that each have a gate, source, drain, and body, although other transistor types may be used.

A first terminal of a voltage source 186 communicates with a first terminal of an inductor 188. A second terminal of the inductor 188 communicates with the drain of the first transistor 182, and also with a positive terminal of a diode 190. A first terminal of a drive circuit 191 communicates with the gate of the first transistor 182. A second terminal of the drive circuit 191 communicates with the source of the first transistor 182. A negative terminal of the diode 190 communicates with a first terminal of a capacitor 192. A second terminal of the capacitor 192 communicates with a second terminal of the voltage source 186. The body and the source of the first transistor 182 communicate with the source and the body of the second transistor 184. The gate of the second transistor 184 communicates with the first terminal of the voltage source 186. The drain of the second transistor 184 communicates with the second terminal of the voltage source 186.

In one embodiment, the drive circuit 191 outputs a pulse width modulated square wave signal to the gate of the first transistor 182. This causes the exemplary circuit 180 to act as a boost converter, with the duty cycle of the square wave signal controlling the average and ripple voltages across the capacitor 192.

In normal operation, the gate-to-source voltage ($V_{GS}$) of the second transistor 184 is positive, and the second transistor 184 conducts current. The second transistor 184 conducts current only when current flows through the first transistor 182. When the first transistor 182 switches off, current forced through the diode 190 does not flow through the second transistor 184. This increases the possible voltage that can be created across the capacitor 192 by not interposing the voltage drop of the second transistor 184 into the current path leading from the voltage source 186 to the capacitor 192. In addition, the second transistor 184 can be less expensive than it would be if it had to sustain continuous current flow.

Referring now to FIG. 3B, an electrical schematic 200 depicts the exemplary circuit of FIG. 3A when the voltage source 186 is connected with reverse polarity. To make operation more apparent, the circuit has been redrawn upside down. The gate of the second transistor 184 is now at the lowest voltage potential in the circuit. The voltage at the source of the second transistor 184 can be no less than the lowest voltage potential in the circuit, so $V_{GS} \leq 0$. The second transistor 184 is thus turned off, and no current will flow in the circuit.

Figure 4:
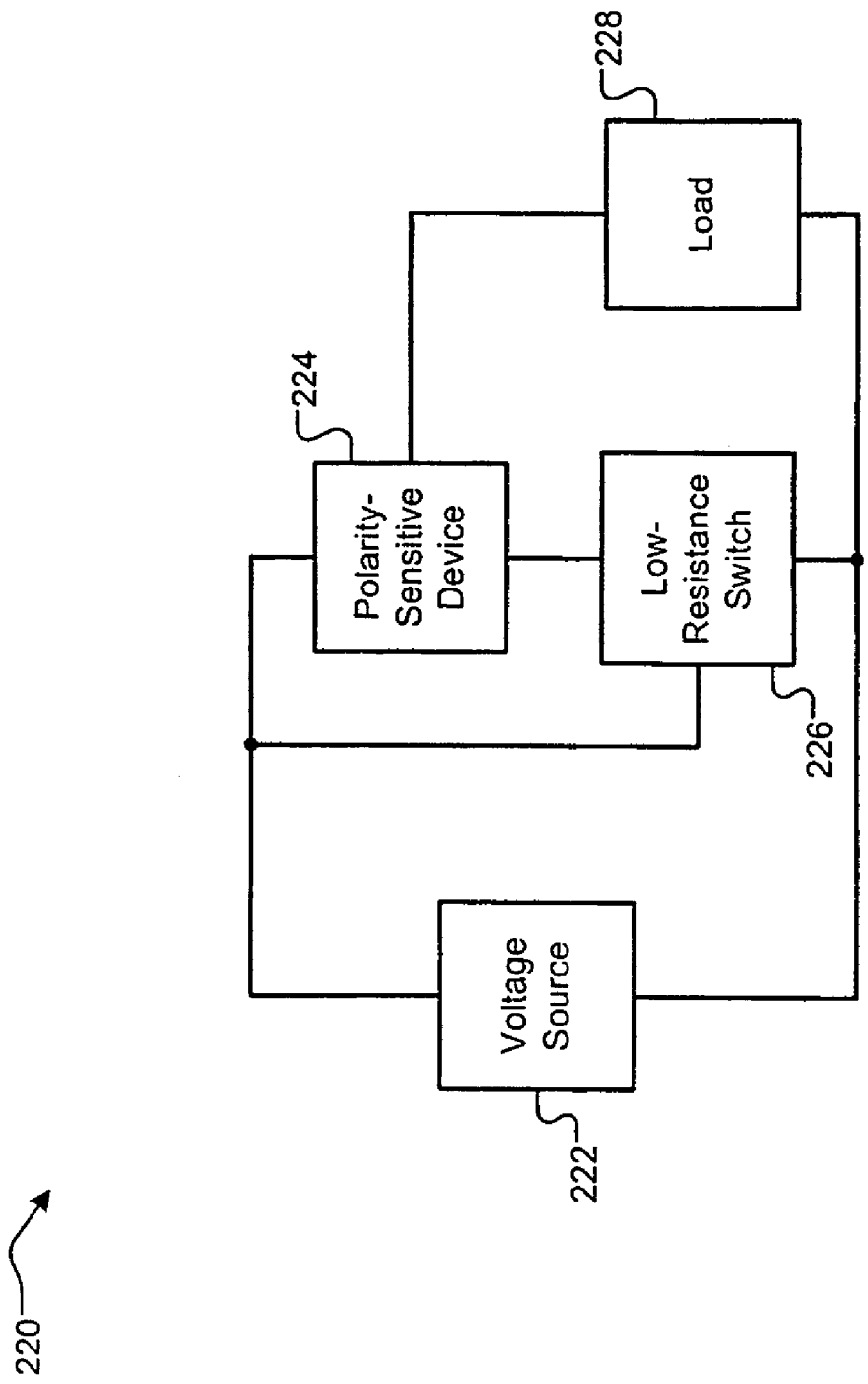
FIG. 4 is a block diagram of an exemplary system incorporating a reverse polarity protection system according to the principles of the present invention.

Referring now to FIG. 4, a block diagram of an exemplary system 220 incorporating a reverse polarity protection system according to the principles of the present invention is presented. FIG. 3A depicts a specific implementation of this exemplary system 220. A positive terminal of a voltage source 222 communicates with a first terminal of a polarity-sensitive device 224 and with a first terminal of a low-resistance switch 226. A second terminal of the polarity-sensitive device 224 communicates with a second terminal of the low-resistance switch 226. A third terminal of the low-resistance switch 226 communicates with a negative terminal of the voltage source 222. Optionally, a first terminal of a load 228 communicates with a third terminal of the polarity-sensitive device 224, and a second terminal of the load 228 communicates with the negative terminal of the voltage source 222.

The voltage source 222 provides a supply voltage between its positive and negative terminals. The polarity-sensitive device 224 is a device that is preferably operated only when the voltage applied to it is positive. To this end, the low-resistance switch 226 assumes a conducting state when the supply voltage is greater than a threshold voltage, and a non-conducting state when the supply voltage is less than the threshold voltage. The low-resistance switch 226 is designed to offer a low resistance connection between the voltage source 222 and the polarity-sensitive device 224 in the conducting state. Any current transferred to the load 228 from the polarity-sensitive device 224 does not flow through the low-resistance switch 226, and instead flows directly to the second terminal of the voltage source 222. The low-resistance switch 226 thus generates no loss for current flowing through the load 228.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A reverse polarity protected system for a voltage source that includes positive and negative terminals, comprising:

a polarity-sensitive device that has a first terminal that communicates with the positive terminal of the voltage source, and that includes a second terminal;

a low-resistance switch that has a first terminal that communicates with the positive terminal of the voltage source, a second terminal that communicates with the negative terminal of the voltage source, and a third terminal that communicates with said second terminal of said polarity-sensitive device, wherein said low-resistance switch assumes a conducting state between its second and third terminals when a first voltage at the positive terminal of the voltage source minus a second voltage at the negative terminal of the voltage source is greater than a first threshold voltage, and wherein said low-resistance switch assumes a non-conducting state between its second and third terminals when said first voltage minus said second voltage is less than a second threshold voltage; and a drive circuit having first and second terminals, wherein said first terminal of said drive circuit communicates with a control terminal of said polarity-sensitive device, and said second terminal of said drive circuit communicates with said second terminal of said polarity-sensitive device.

2. The reverse polarity protected system of claim 1 wherein said drive circuit produces a pulse-width-modulated square wave signal between said first and said second terminals of said drive circuit.

3. The reverse polarity protected system of claim 1 wherein said low-resistance switch includes a first transistor.

4. The reverse polarity protected system of claim 3 wherein said first transistor is an n-channel field effect transistor (FET) that has a gate terminal, a drain terminal, and a source terminal.

5. The reverse polarity protected system of claim 4 wherein said first and second threshold voltages are equal to a physical threshold voltage of said first transistor.

6. The reverse polarity protected system of claim 5 wherein said gate terminal of said first transistor communicates with the positive terminal of the voltage source, said source terminal of said first transistor communicates with said second terminal of said polarity-sensitive device, and said drain terminal of said first transistor communicates with the negative terminal of the voltage source.

7. The reverse polarity protected system of claim 6 wherein said first transistor also includes a body terminal that communicates with said source terminal of said first transistor.

8. The reverse polarity protected system of claim 1 wherein said polarity-sensitive device comprises a second transistor and an inductor, wherein said second transistor communicates with said inductor.

9. The reverse polarity protected system of claim 8 wherein said second transistor is an n-channel field effect transistor (FET) that has a gate terminal, a drain terminal, and a source terminal.

10. The reverse polarity protected system of claim 9 wherein said source terminal of said second transistor communicates with said third terminal of said low-resistance switch, said drain terminal of said second transistor communicates with a first terminal of said inductor, and a second terminal of said inductor communicates with the positive terminal of the voltage source.

11. The reverse polarity protected system of claim 10 wherein said second transistor also includes a body terminal that communicates with said source terminal of said second transistor.

12. The reverse polarity protected system of claim 9 wherein said drain terminal of said second transistor is a third terminal of said polarity-sensitive device, and said gate terminal of said second transistor is said control terminal of said polarity-sensitive device.

13. The reverse polarity protected system of claim 1 further comprising a load device that communicates with a third terminal of said polarity-sensitive device, and that also communicates with the negative terminal of the voltage source.

14. The reverse polarity protected system of claim 13 wherein said load device comprises a diode and a capacitor.

15. The reverse polarity protected system of claim 14 wherein a first terminal of said capacitor communicates with a negative terminal of said diode, a second terminal of said capacitor communicates with the negative terminal of the voltage source, and a positive terminal of said diode communicates with said third terminal of said polarity-sensitive device.

* * * * *